US005121144A

United States Patent [19]

Larson et al.

[11] Patent Number: 5,121,144

[45] Date of Patent: Jun. 9, 1992

[54] METHOD TO ELIMINATE CROSS COUPLING BETWEEN BLACKNESS POINTS AT PRINTERS AND A DEVICE TO PERFORM THE METHOD

[75] Inventors: Ove Larson, Fullriggaregatan; Bengt Bern, Goteberg, both of Sweden

[73] Assignee: Array Printers AB, Sweden

[21] Appl. No.: 637,062

[22] Filed: Jan. 3, 1991

[30] Foreign Application Priority Data

Jan. 3, 1990 [SE] Sweden .............................. 9000031

[51] Int. Cl.$^5$ .............................. G01D 15/06

[52] U.S. Cl. .............................. 346/154; 346/155

[58] Field of Search .............................. 346/154, 159, 155

[56] References Cited

U.S. PATENT DOCUMENTS

| | | | |
|---|---|---|---|
| 4,990,942 | 2/1991 | Therrien et al. | 346/159 X |
| 5,006,869 | 4/1991 | Buchan et al. | 346/159 |
| 5,036,341 | 7/1991 | Larsson | 346/154 |

*Primary Examiner*—George H. Miller, Jr.

*Attorney, Agent, or Firm*—Ostorlenk, Faber, Gerb & Soffen

[57] ABSTRACT

Method and device to improve the printing quality and thereby the readability of the print of electrographic printers. An information carrier is brought into electric cooperation with at least one screen grid shaped electrode matrix, which by control in accordnace to the configuration desired pattern at least partly opens and closes passages through the matrix by galvanic connection to this to at at least one voltage source. Through thus opened passages electrical fields are exposed for attraction of pigment particles against the information carrier. This is locateable between said electrode matrix and a background electrode. This contains counter electrodes (8,8') in the form of galvanically separated sections, which are suibstantially symmetrically located above respective line of passages in the electrode matrix.

8 Claims, 9 Drawing Sheets

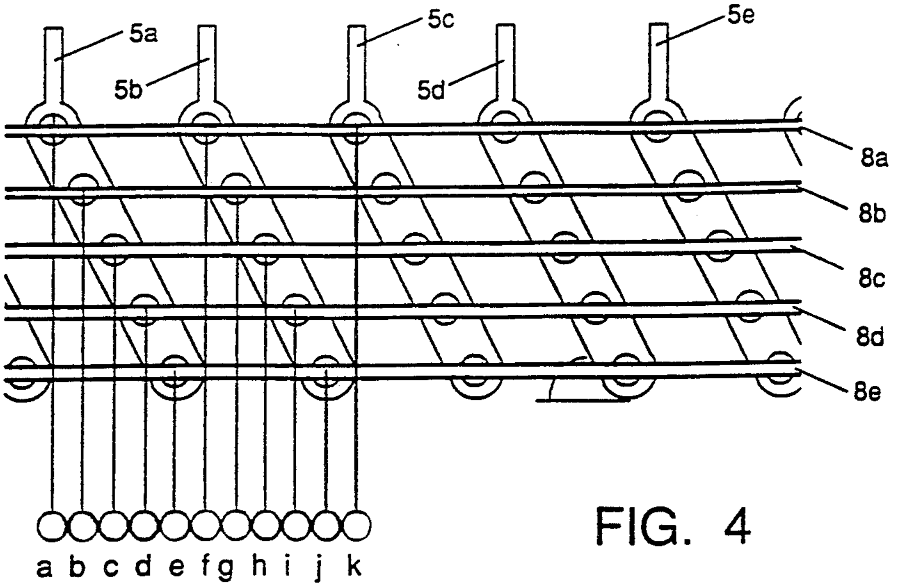
FIG. 4
FIG. 5
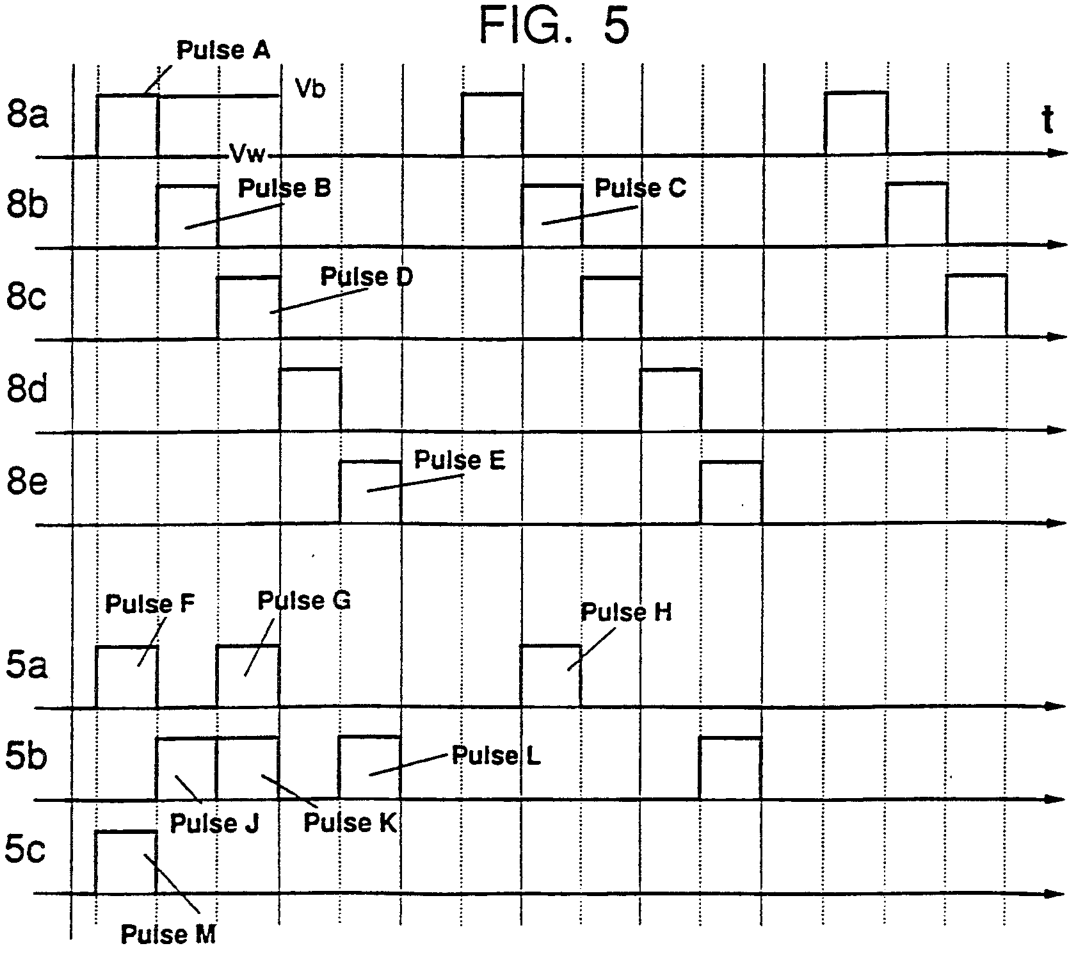

METHOD TO ELIMINATE CROSS COUPLING BETWEEN BLACKNESS POINTS AT PRINTERS AND A DEVICE TO PERFORM THE METHOD

The invention concerns a method to improve the printing quality of printers which preferably produce a latent electric charge pattern of electric signals and develop this on an information carrier by means of pigment particles, e.g. by an electrode matrix and devices to perform the method.

BACKGROUND OF THE INVENTION

In the Swedish patent application 8704883-1 and following international patent applications e.g. PCT-SE88-00653 there are shown methods to develop pictures and texts by means of pigment particles on an information carrier, directly from computer generated electric signals, without need for these signals to be intermediately stored at a temporary conversion to light energy, which is the case in photo conductive printers e.g. laser printers. These tasks have been solved by bringing the information carrier into electric cooperation with at least one screen or grid formed matrix, preferably an electrode matrix, which by control in accordance to the desired pattern configuration at least partly opens and closes passages through the matrix by galvanic connection of this to at least one voltage source, and that through thus opened passages an electric field is exposed for attraction of the pigment particles towards the information carrier.

This method (in the following called the EMS -Concept), as it is described in the above patent applications, however may imply that the printing produced does not show high quality enough. This is the fact in particular in embodiments with the multiple line electrode matrix according to the invention. It has been verified that it is difficult to "address" a single passage or mesh in the electrode matrix without influencing surrounding passages wholly or partially and hereby cause undesired blacking dots on the background of the printed paper. This phenomenon in the following is called cross coupling between passages.

Cross coupling between passages is not limited to the EMS -Concept but is found, wholly or partially, in several electrographic printing concepts where passages are created in an electric way, e.g. GB 2108432A.

What is common to all problems and drawbacks in the state of art is the printing quality and thereby the readability being affected in a negative sense with reduced competitiveness and low value for the user as a result.

THE OBJECT OF THE INVENTION AND MOST IMPORTANT FEATURES

The object of the invention is to create a method which gives EMS, and other electrographic printing concepts, high quality prints with good readability without cross coupling between passages.

These objects have been accomplished by letting the back ground electrode, which on the whole generates the driving field, be divided into galvanically separated sections which sections are substantially symmetrically located above respective line of passages. Thus every section can be individually put under voltage to a level which is optimum at every moment of the developing process. The electric field acting on the pigment particles hereby only will act through the number of passages or meshes in the electrode matrix which are going to develop blacking dots. The rest of the lines which are not exposed to the developing field, hereby are not able do develop any pigment particles. This invention implies that the electrode matrix can be simplified to comprise only one layer with substantially parallel electrodes.

The invention also implies that other printer concepts, which earlier were obliged to use an individual control signal for every single passage with the purpose of avoiding cross coupling, may reduce the amount of drive electronics and thereby the cost, by letting several passages be galvanically connected to one and the same control signal.

DESCRIPTION OF THE DRAWINGS

FIG. 4 shows how the blacking dots are developed in an electrode matrix according to FIG. 3.

FIG. 5 shows a sequence diagram in principle for control of the voltage of the electrodes in FIG. 4.

DESCRIPTION OF EMBODIMENTS

Figure 1A:
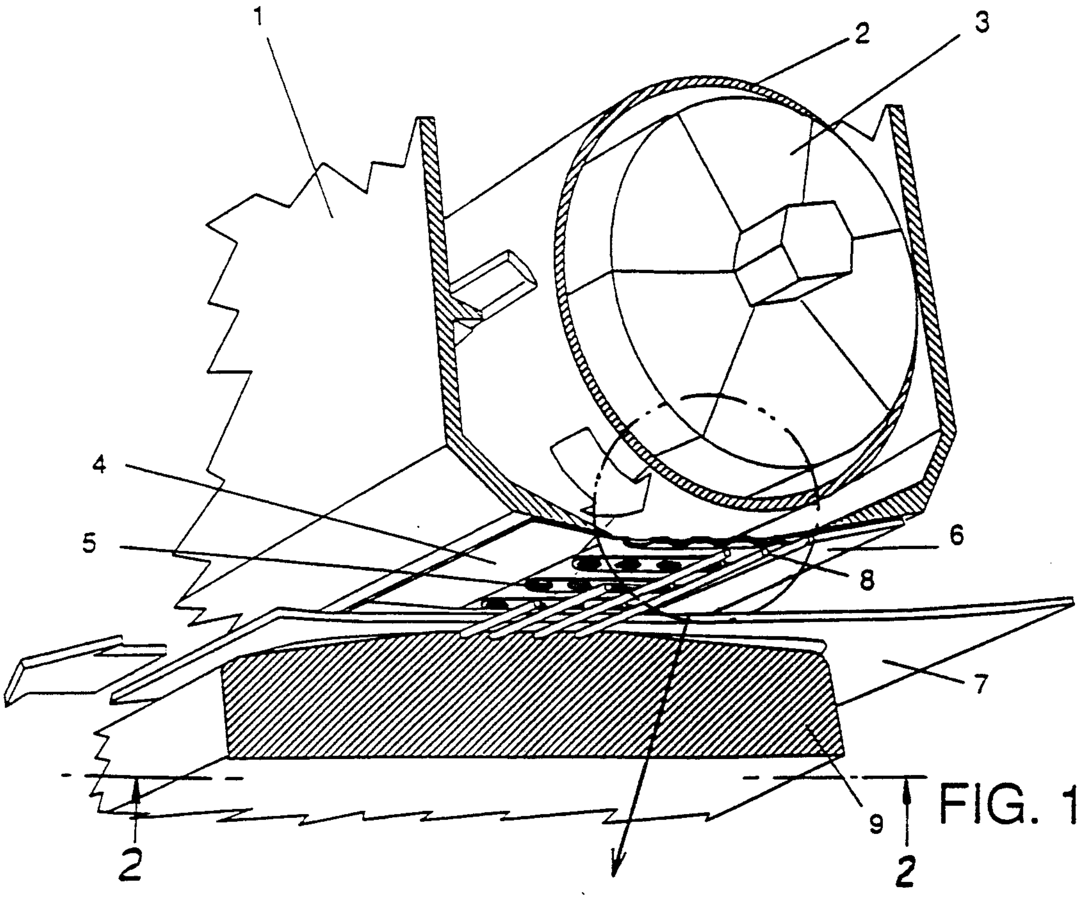
FIG. 1*a* shows in perspective view a cut off section of a device according to the invention.

In the drawings of the figures which show embodiments according to the invention is designated:

1 a container for pigment particles, e.g. toner, which also constitutes a bracket for the electrode matrix

2 a developing roller

3 a multiple magnetic core for attraction of the pigment particles towards the developing roller

4 a carrier for the electrode matrix e.g. polyimide film

5 an electrode in an electrode matrix; with the designation 5' is referred to an electrode which is connected to a voltage which permits developing through the passages of the electrodes.

6 a spacing which prevents the paper to touch the electrode matrix

7 an information carrier, called paper

8 a section of a divided background electrode 9 a bracket for the sections of the background electrode
10 a pigment particle
11 a blacking dot consisting of developed pigment particles, called dot
12 a control device for background electrode sections
13 a passage or mesh
14 an electrode in a printer concept which is based on the fact that two from each other separated electrodes generates a field which is opposed the driving field
15 a diode
16 a capacitor In the EMS - concept and other electrographic printer concepts it is common to utilize a background electrode. By connecting a voltage to the background electrode which attracts the charged pigment particles, an electric field which is propulsive on the particles will be created generally between the developing roller 2 and said background electrode. Since it is desirable to reduce the number of drive and control devices in a printer it is desirable to use multiple line electrode matrices where two or several passages 13 are galvanically joined in patterns.

Until now it has been customary to let the background electrode be constituted by a disc shaped means which covers all passages contained in the electrode matrix. All passages 13 which are not intended to develop any blackness in a certain moment thus must have the capacity to "block" the driving field from the background electrode so that the field strength in the passage with good margin is less than that for attraction of the pigment particles. With commercially usable drive circuits the difference between the blocking voltage Vw and the voltage which admits developing Vb is limited to some hundreds of volts. This voltage is not sufficient to block the driving field whereby undesired developing will occur through passages which should be blocking, so called cross coupling. This causes background blackness on the printed paper.

Figure 1B:
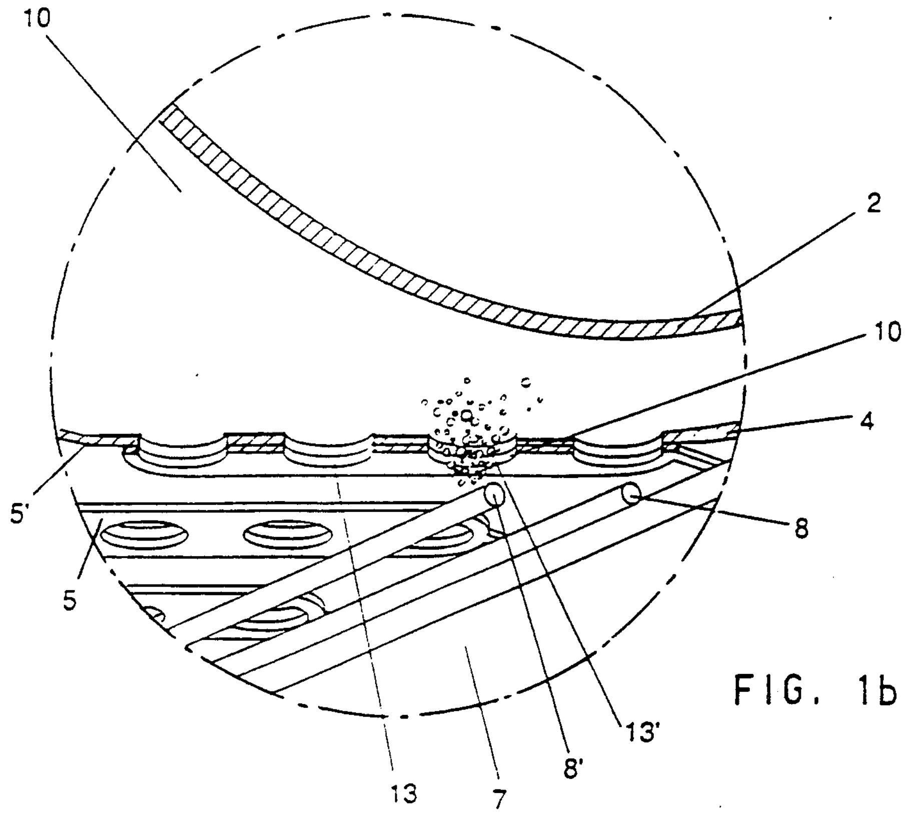
FIG. 1*b* shows an enlargement of the electrode matrix with surrounding means in FIG. 1*a*.

In FIG. 1 is shown how the previous disc shaped background electrode has been replaced with wire shaped segments 8. Every such wire 8 is covered with an isolating layer which galvanically isolates the segments 8 from each other. Further the electrode matrix only consists of one layer of electrodes 5. Every electrode 5 in this example contains 4 passages. Every electrode 5' which has been connected to "black voltage" Vb thus should reproduce 4 dots if a common plate formed background electrode should have been used.

Figure 2:
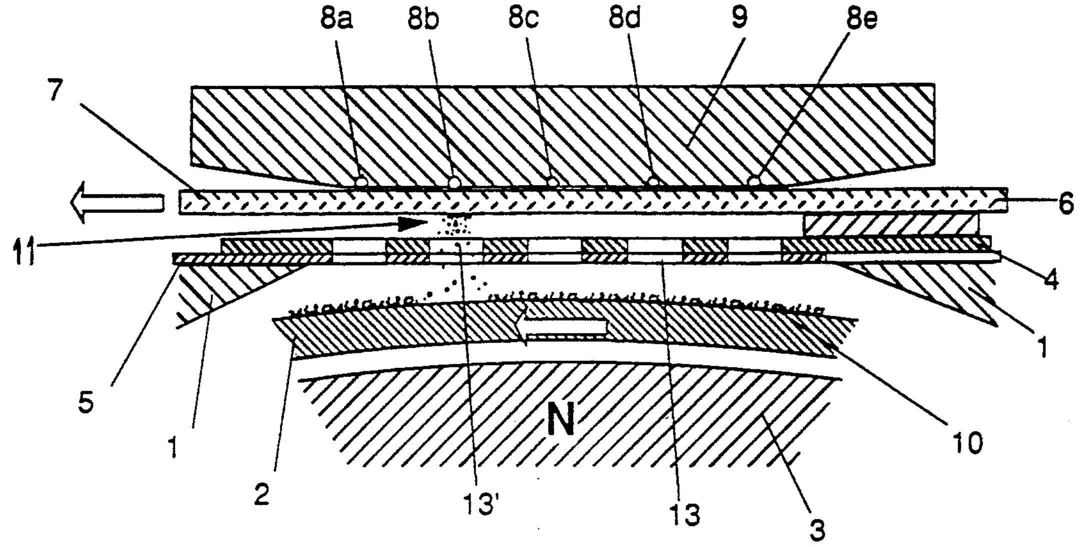
FIG. 2 shows a lateral view of an embodiment with divided background electrode.
Figure 3:
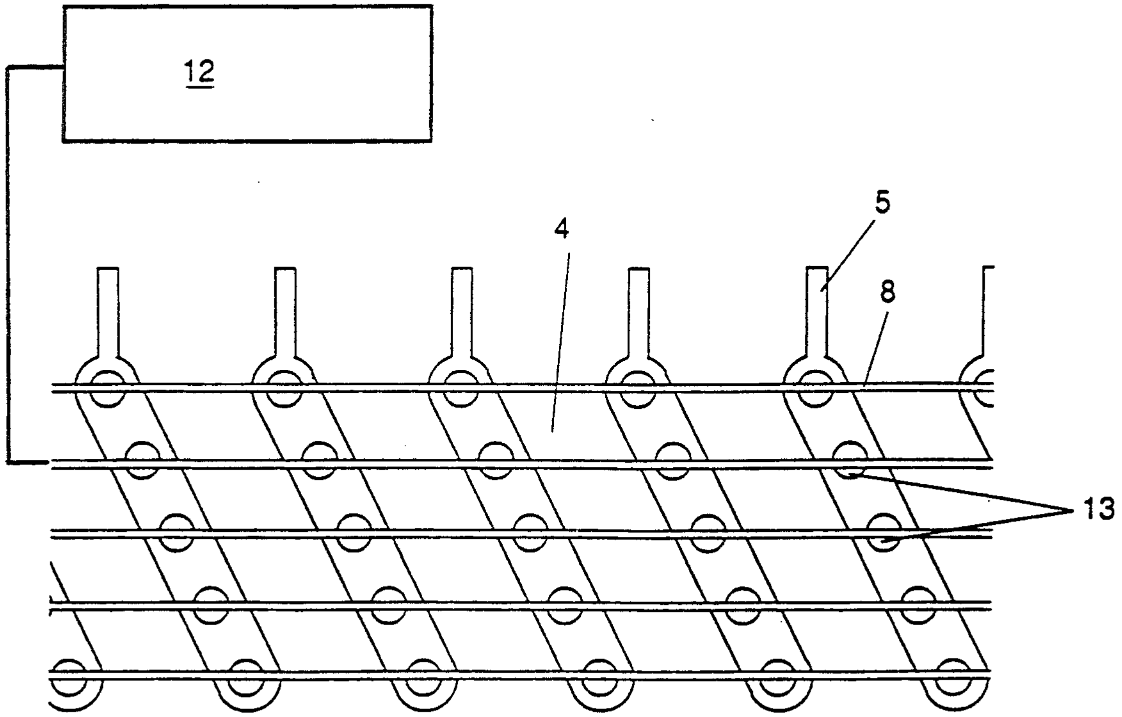
FIG. 3 shows an example of the device in FIG. 2, from above.
Figure 14:
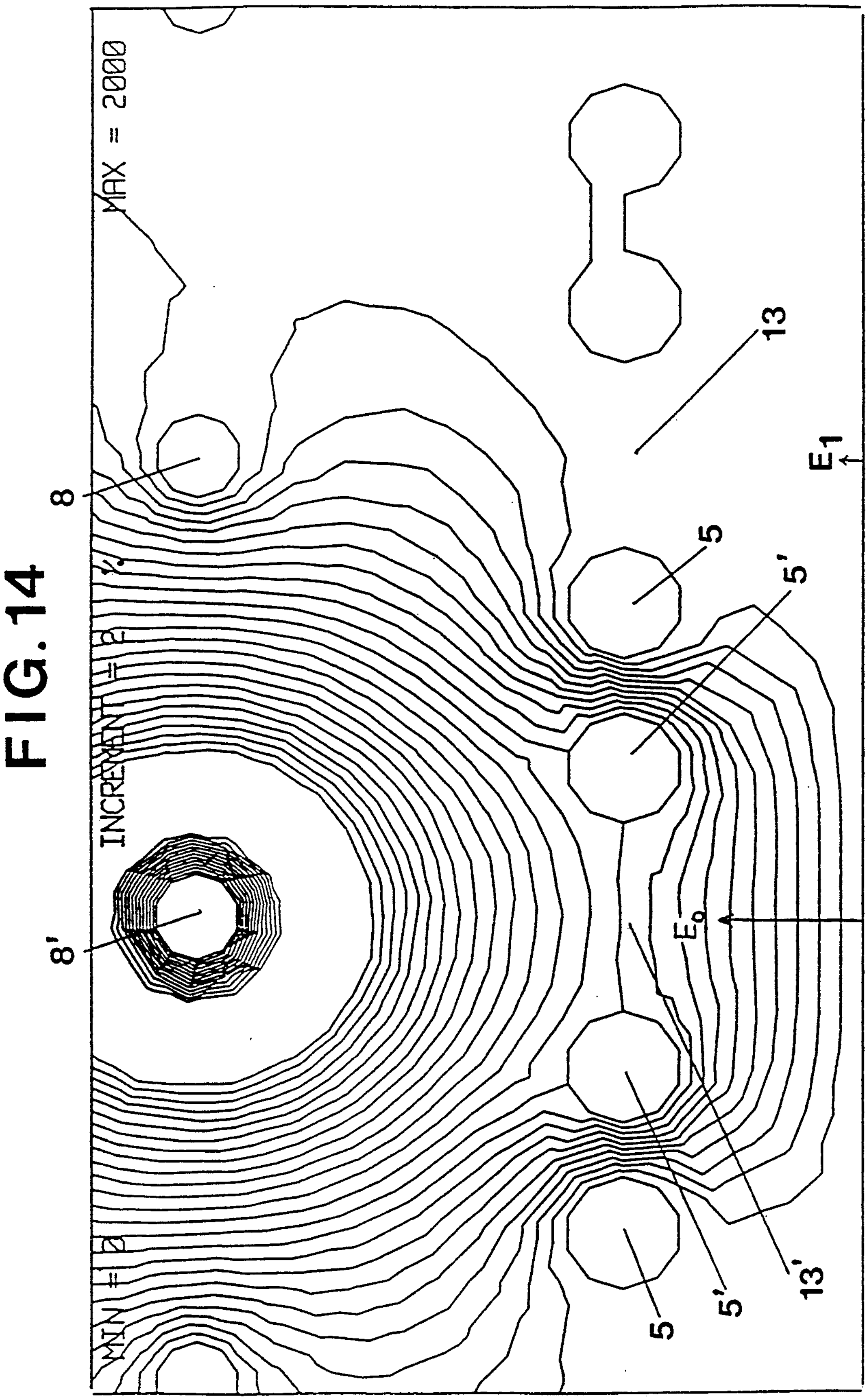
FIG. 14 shows a typical plot from a FEM- calculation of the field pattern.

If a divided background electrode with segment 8 is used and only one segment 8 at the same time is connected to voltage which acts attracting on the pigment particles 10, only one of the passages 13' will develop a dot on the paper 7. If e.g. minus charged toner is used, 8' can be connected to 2kV while the remaining three segments may have the same potential as the developing roller 2. The non active segments even can be connected to a voltage which acts repelling on the pigment particles. This is also diagrammatically shown in FIG. 2. In FIG. 14 is shown a typical plot from a numerical calculation of the field pattern which clearly indicates that the value of field strength in the passage E1 next to the passage 13' will not develop any particles on the paper, (the lines in the figure shows the equipotential lines of the field). (EO=1,75 V/μm; E1=0,06 V/μm in this specific example).

By tilting the electrodes 5 at an angle alfa the dots printed on the paper can be made to be positioned in an evenly distributed line. This is shown in FIG. 4. Thus Dot **11*a* will be produced as a function of the pulses A and F according to FIG. 5. The dot 11*c* will be developed when segment 8*c* has a black voltage at the same time as the electrode 5*a*** has a black voltage. This is shown diagrammatically with pulse D and G.

In the example it is also evident that the dot **11*h* is printed simultaneously as 11*c* by also the electrode 5*b* obtaining black voltage in pulse K. The sequential pulsing of the segments 8, according to 8*a*, 8*b*, 8*c*, 8*d*, 8*e*, 8*a*, 8*b* and so on is called macro scanning. It falls on the control system of the printer to put voltage on all electrodes 8'** in question syncronously with the activation of the background electrode segments.

Figure 6:
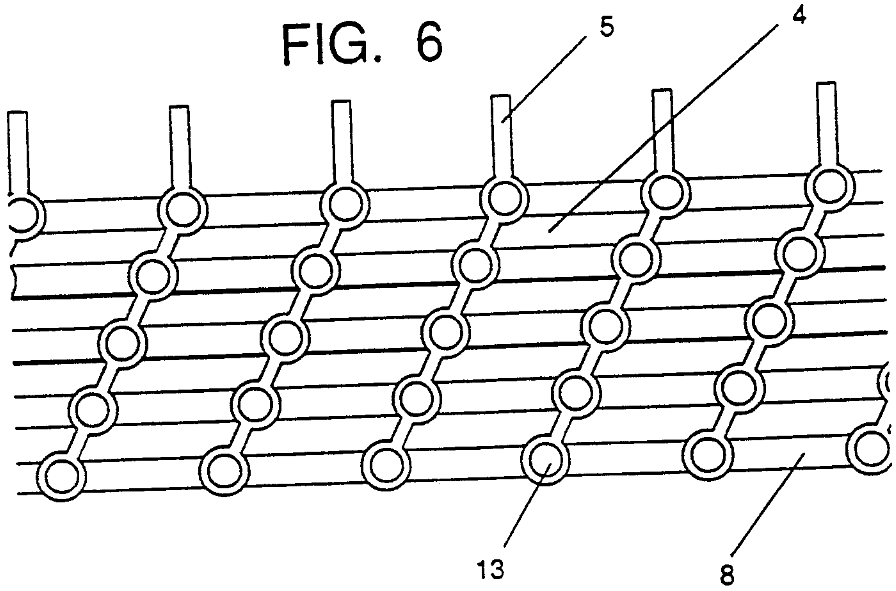
FIG. 6 shows a modified embodiment of the electrode matrix.

FIG. 6 shows an embodiment seen from the developing roller. according to this the mass and/or size of the electrode 55 has been reduced in order to reduce the screening effect of the electrode on the driving field. Further the segments have also been designed as strip shaped means instead of wire shaped means as is previously shown.

Figure 7:
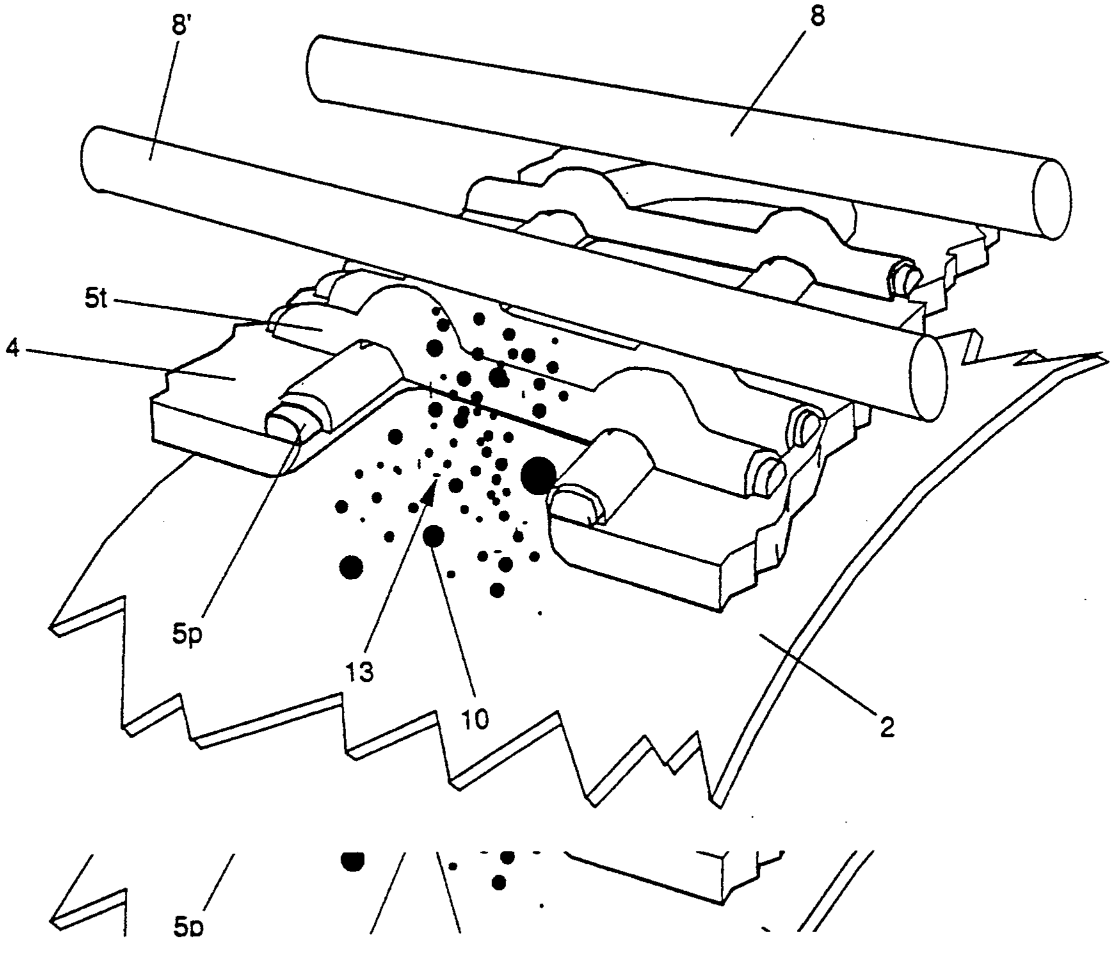
FIG. 7 shows the invention applied to an electrode matrix with two substantially ortogonal electrode layers in accordance with the original EMS concept.

FIG. 7 shows how the invention has been applied on an electrode matrix according to the basic embodiment for the EMS -concept. Hereby is shown a two layer electrode matrix **5*p* and 5*t*** with substantially transversal electrodes.

Figure 8:
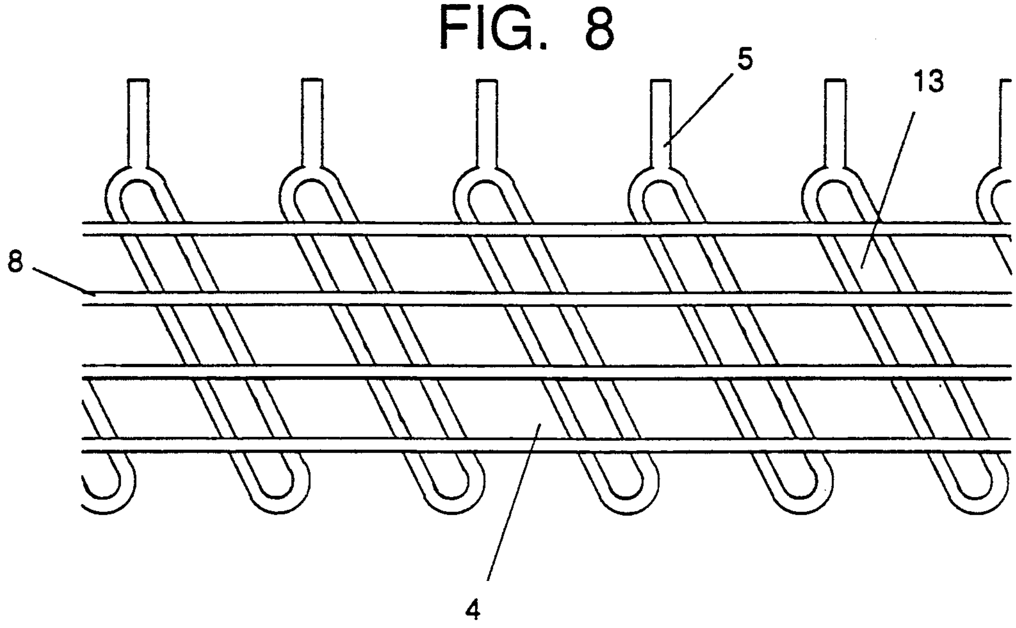
FIG. 8 shows a modified embodiment with oblong passages in which several blacking dots can be developed.

FIG. 8 shows oblong passages 13 which have no physical and /or electric screenings between the individual passages for every individual dot.

Figure 9:
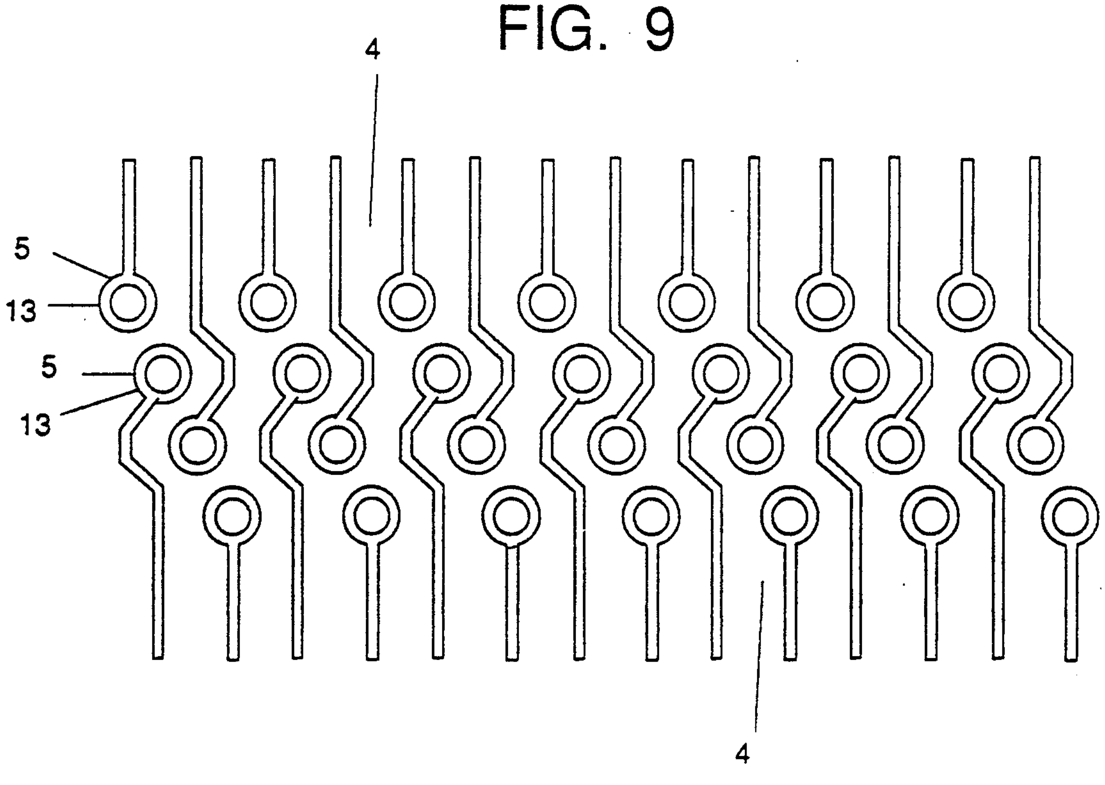
FIG. 9 shows a cross coupling free modified embodiment with individual controls to every passage.

FIG. 9 shows another cross coupling free embodiment of an EMS- electrode matrix. According to this every passage is individually surrounded by an electrode 5 connected to a control device which results in a substantially enhanced printing performance for the invention. Also in this case the passages have been arranged in a tilted pattern in order to give space to the connections. Since every passage is not surrounded by any other electrode than the intended neither can this variant cause undesired developing in white "passages". the embodiment in FIG. 9 can be driven with both a conventional background electrode of a plate shaped fully covering design or a divided one as described above.

Figure 10:
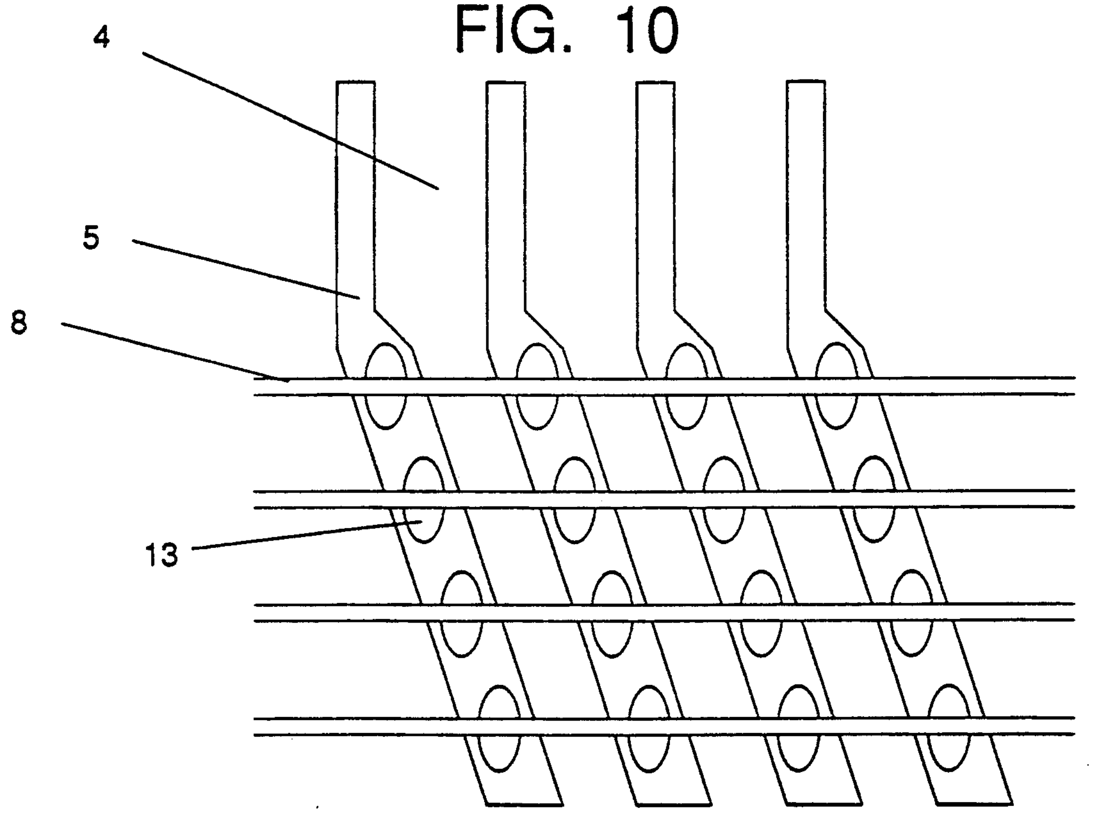
FIG. 10 shows how the passages can be designed unsymmetrically in order to compensate for the extension of the background electrode section.

FIG. 10 exemplifies how the passages can be optimized in shape in order to create intended shape of the dots, commonly circular. Since e.g. the segment 8 is line shaped the field pattern on the surface of the paper also may take an oblong extension. Hereby it might be desirable to compensate for this deviation by forming the passages 13 elliptic.

Figure 11:
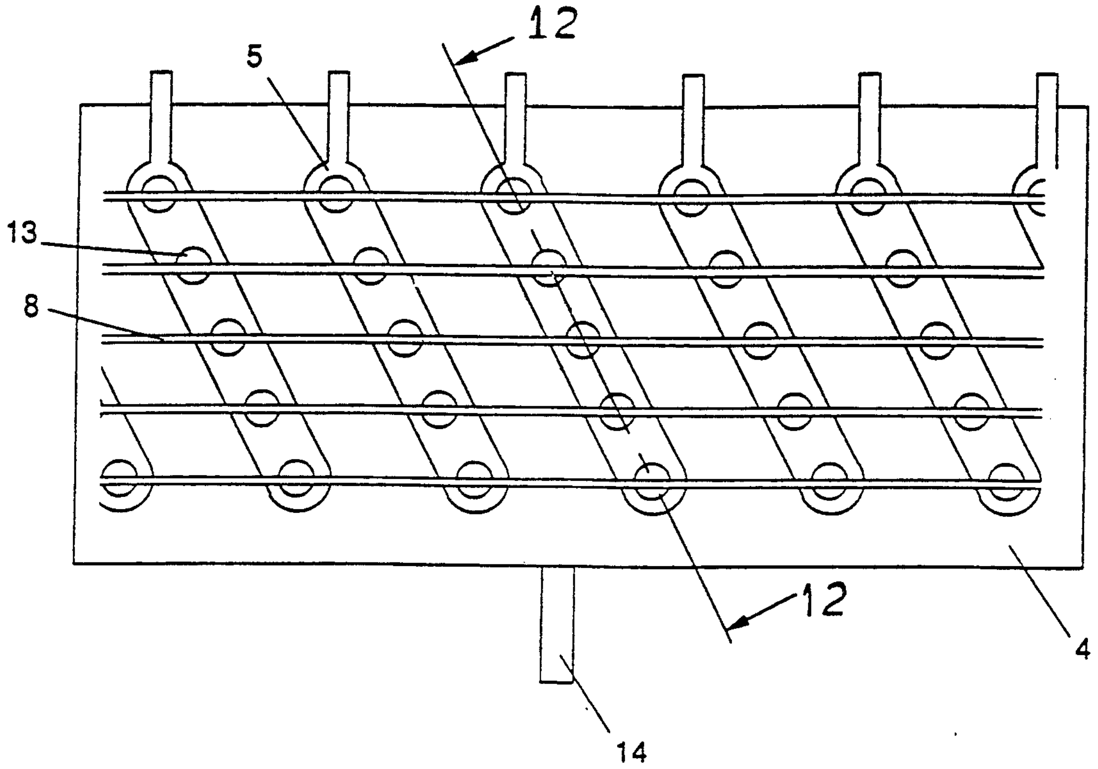
FIG. 11 shows the invention applied on another electrographic printer concept.
Figure 12:
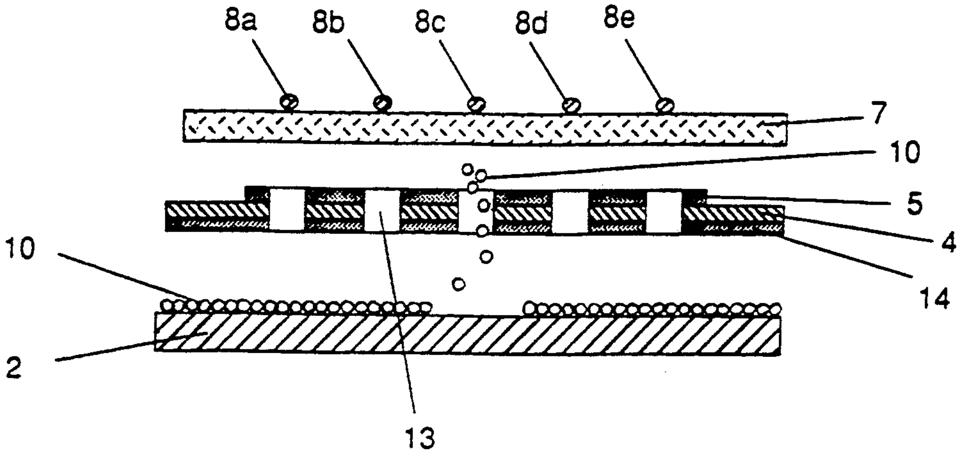
FIG. 12 shows the device according to FIG. 11 in lateral view.

In FIG. 11 and 12 is shown how the invention can be applied to a printer concept which is described in GB 2 108 432A. According to the original invention this concept was reduced to drive every individual passage with a drive circuit, in order to avoid cross coupling, which substantially raises the price of the product. By applying a divided background electrode and letting the electrode 5 surround more passages than one, the number of drive circuits may be reduced according to the above.

Figure 13:
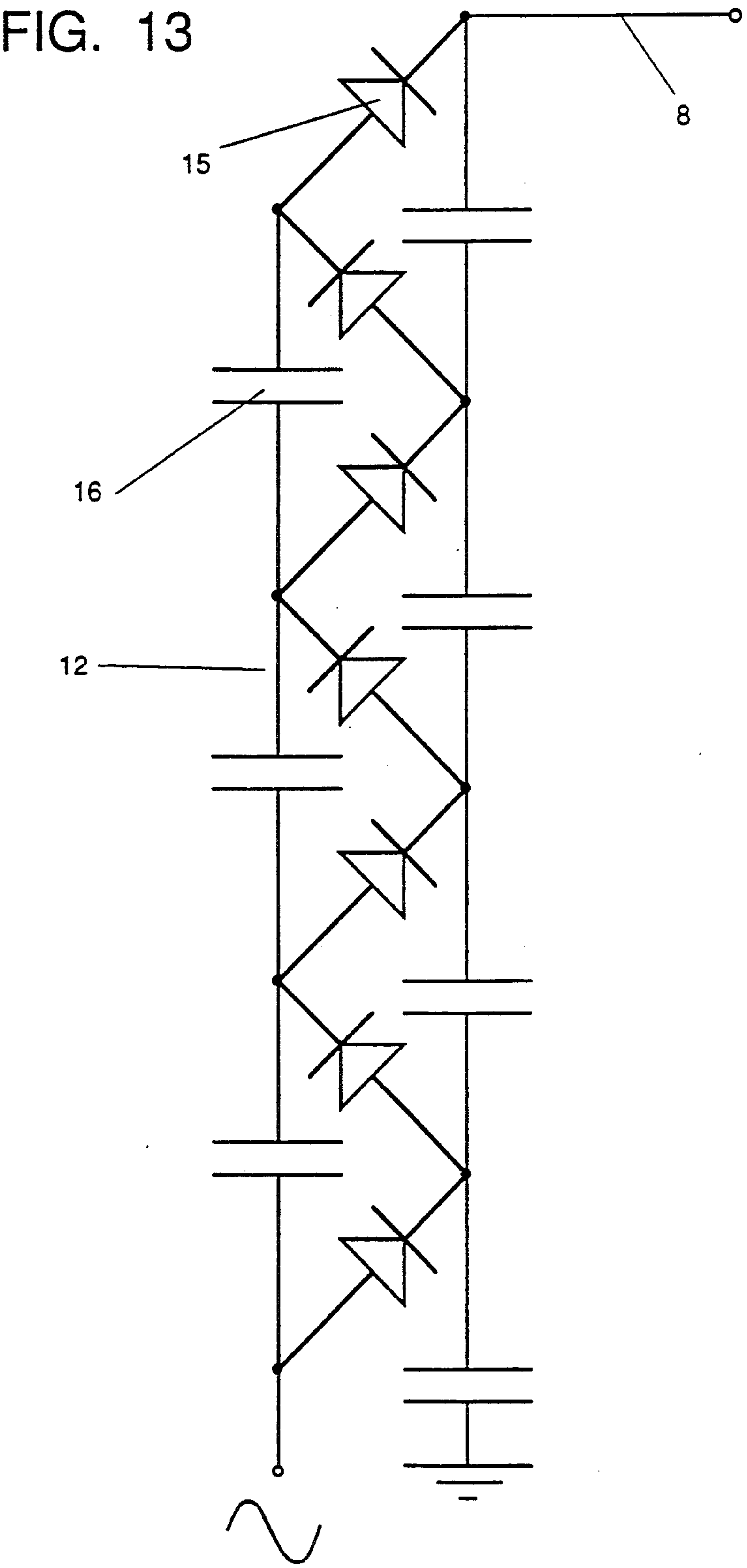
FIG. 13 shows an example of a control device for a divided background electrode.

The control device 12 for pulsing of the segments 8 in the macro scanning cycle should with a relatively high speed be able to change the voltage with some kV:s of every segment. FIG. 13 shows an example on such a device which is constituted by a diode cascade. A high frequency alternating voltage preferably triangularly shaped, is connected to the input terminals of the cascade. The input voltage then will increase in the connection points of the cascade for every pulse on the input terminals. Thus it is possible to obtain very high voltages in rapid processes by means of such a device. The device 12 however can be designed according to several principles which are not mentioned here.

The invention is not limited to methods and devices described herein. Thus it is possible to apply the invention on other developing and pigment particle systems than those shown herein, e.g. mono component tuner with carrier. Parts of the invention are also useful when the electrode matrix is placed behind the paper such as described in e.g. PCT-SE88-00653.

Further the distance between the passages in every electrode 5 could be made considerably larger than has been shown in the figures.

The pattern of the passages and mutual location within and outside every electrode and external form can be varied in a number of different ways.

The electrode matrix certainly can be made from a fabric with e.g. an electrically isolating material which bonds the fabric and runs substantially transversal of the electrodes. Spaces between wires in the fabric may be sealed by colour or other suitable materials.

We claim:

1. Method to improve the printing quality of electrographic printers of the type, where an information carrier is brought into electric cooperation with at least one screen or grid shaped electrode matrix, which by control in accordance to desired configuration of the pattern at least partially opens and closes passages through the matrix by galvanic connection of this to at least one voltage source, and that by thus opened passages electric fields are exposed for attraction of pigment particles towards the information carrier, which is locateable between said electrode matrix and a background electrode, characterized therein, that the background electrode which comprises galvanically separated electrodes (8) as well as electrodes (5) in the electrode matrix individually can be given a voltage to a voltage level which is optimal for the process at every moment of time of the developing process.

2. Device to carry out the method according to the method according to patent claim 1, at electrographic printers of the type, where an information carrier is brought into electric cooperation with at least one screen or grid shaped electrode matrix, which by control in accordance to desired configuration of the pattern at least partially opens and closes passages through the matrix by galvanic connection of this to at least one voltage source, and that by thus opened passages electric fields are exposed for attraction of pigment particles towards the information carrier, which is locateable between said electrode matrix and a background electrode, characterized therein, that the background electrode comprises individual counter electrodes (8, 8′ ) which are galvanically separated, which counter electrodes are essentially symmetrically located above respective line of passages (13) in the electrode matrix.

3. Device according to patent claim 2, characterized therein, that the galvanically separated counter electrodes (8) comprise electrically conducting wire or strip shaped means (8) covered with an isolating layer, which galvanically isolates the means from each other.

4. Device according to patent claim 2, characterized therein, that a control device (12) is included in the printer for individual control of the voltage in every counter electrode (8).

5. Device according to patent claim 2, characterized therein, that the electrodes (5) of the electrode matrix include only electrodes (5) arranged in parallel and that the counter electrodes (8) are arranged in angle to the electrodes (5) of the electrode matrix, so that they together are crosswise arranged, but located in different planes.

6. Device according to patent claim 4, characterized therein, that those counter electrodes (8), which are not active for exposing of electric fields, are connectable to a voltage which repels the pigment particles.

7. Device according to patent claim 5, characterized therein, that the electrodes (5 or 8) in one of the planes are tilted (angle $\alpha$) with respect to the electrodes (8 or 5) in the other plane.

8. Device according to patent claim 5, characterized therein, that the electrodes (5) of the electrode matrix at least partly are strip shaped and formed with at least one recess (13), as a passage for the pigment particles.

* * * * *